2,964,469
DRILLING MUD COMPOSITIONS

Lloyd Eugene Van Blaricom and Kenneth Russell Gray, Shelton, Wash., assignors to Rayonier Incorporated, Shelton, Wash., a corporation of Delaware No Drawing. Filed Mar. 1, 1957, Ser. No. 643,261

6 Claims. (Cl. 252—8.5)

This invention relates to chemicals derived from the bark of certain coniferous trees and to drilling mud compositions formed therefrom, and has for its object the provision of improved drilling mud compositions.

The barks of Douglas fir (*Pseudotsuga menziesii*), Sitka spruce (*Picea sitchensis*) and southern yellow pine, the several species of which are known as slash pine (*Pinus elliotti* (formerly *caribaea*)), longleaf pine (*Pinus palustris*), loblolly pine (*Pinus taeda*), ponderosa pine (*Pinus ponderosa*), lodgepole pine (*Pinus contorta*), shortleaf pin (*Pinus echinata*), western hemlock (*Tsuga heterophylla*), and eastern hemlock (*Tsuga canadensis*) are advantageously suitable for solvent extraction followed by digestion in an aqueous solution of an alkali metal salt of sulfurous acid to form aromatic bark products for use in forming the drilling mud of our invention. These products act as deflocculating and dispersing agents and are effective in controlling the rheological properties of clay-containing muds used in drilling oil and gas wells.

A drilling mud usually contains hydratable clay from the formation being drilled dispersed in water and, if desired, additional materials such as sodium bentonite to improve the colloidal properties, and suspended weighting materials such as barytes to increase the weight of the mud to the desired value. In order that the drilling mud will perform the desired functions properly, it is necessary that it has certain properties or characteristics and that these be maintained in proper balance throughout the drilling operation. The gel forming, viscosity and filtration characteristics of a drilling mud are very important. The gel rate and gel strength are important in controlling the settling of cuttings in the bore hole and of weighting material in the mud pits. The viscosity is important in providing a pumpable mud in which cuttings are circulated out of the well and from which they settle out in the mud pits. Filtration characteristics are important because they are a means of controlling "water loss" and the ability of the mud to "plaster out" on the bore hole wall and form a thin filter cake of low permeability.

The bark reaction products of our invention are particularly advantageous additives for controlling the properties of drilling muds in that they are effective in a wide variety of types of muds and over a wide variety of conditions.

The barks of various coniferous trees have been digested in aqueous solutions of alkali metal salts of sulfurous acid at elevated temperatures to recover from the bark water-soluble sulfonic acid salts of aromatic compounds. Such compounds have been used in drilling mud compositions with varying degrees of success. One objection has been due to excessive foaming in certain drilling operations. We have discovered that the foaming is due largely to the presence in the bark product of the digestion of soap-forming materials such as unsaturated fatty acids, resin acids, and the like, that are removed from the bark along with the aromatic compounds.

In accordance with our invention, we first subject the bark to extraction with an organic solvent to remove at least some of the soap-forming materials, and also the waxes that are removable in the solvent extraction, and then subject the bark to digestion in an aqueous solution of an alkali metal salt of sulfurous acid including alkali metal sulfite or a mixture of alkali metal bisulfite and alkali metal sulfite. When the bark is subjected to solvent extraction which effects a substantially complete extraction of the soap-forming materials, the extraction may be carried out with an aqueous solution of an alkali metal sulfite, for example, sodium sulfite. When the extraction has been carried out either to remove substantially all the soap-forming materials or but a part of the soap-forming materials, the digestion may be carried out in an aqueous solution of alkali metal bisulfite, or a slightly acid mixture of alkali metal bisulfite and alkali metal sulfite. The aqueous digestion removes from the bark an aromatic product for use in forming our improved drilling mud composition.

In the extraction with solvents the bark is preferably dried and ground to a suitable state of subdivision and extracted with a solvent, such as ether, benzene, trichloroethylene, toluene, methylisobutyl ketone, methylethyl ketone, hexane, heptane, and the like, or mixtures of these solvents. Although the extraction may remove an appreciable proportion of the soluble material including the unsaturated fatty acids, resin acids and waxes along with flavonoids, the important materials to be removed for the purposes of the invention are the unsaturated fatty acids and resin acids which are soap-forming and cause foaming in such drilling muds as the lime-base muds.

The digestion of the extracted bark in an aqueous solution of an alkali metal salt of sulfurous acid, is preferably carried out at an elevated temperature resulting in a reaction with insoluble portions of these barks, presumably relatively non-methoxylated phenolic, aromatic constituents, producing water-soluble sulfonic acid salts of aromatic compounds which may be separated from the bark residue.

Bark from trees is usually obtained in large pieces which, for the purpose of treatment in this invention may desirably be reduced in size to pass screens of about 4 to about 20 meshes to the inch in order to avoid an excessive amount of void space in the charge and to aid penetration of the solvent, and reacting aqueous solution. This may be accomplished by conventional means, as by a hammer mill or attrition mill. As an operating expedient, it is also desirable to avoid excessive amounts of fines, such as bark dust, which sometimes clogs filters, although such fines are in condition for rapid extraction and digestion. The extraction with an organic solvent may be carried out in any suitable industrial equipment used for solvent extraction. For laboratory work the Soxhlet extractor, such as one made of glass or stainless steel, is effective. After extraction the bark is heated to remove adhering and imbibed solvent.

We may use the potassium or sodium alkali metal salts, the sodium salt being preferred for economic reasons. It has been found that digestion with the aqueous solution of an alkali metal salt of sulfurous acid following the solvent extraction is preferably at temperatures ranging from about 105° C. to about 200° C. In using the lower temperatures, longer digestion periods are desirable but temperatures as high as 200° C. can be used for digestions of considerable length, say, for example, an hour, without consuming all of the sulfurous acid salts or materially decomposing the organic products. For digestions which are both rapid and relatively efficient, temperatures of about 125° C. to about 175° C. are preferred. When temperatures much above 175° C. are used, some degradation of the extracted product sets in and no important increase in yield is obtained, and where temperatures much below 125° C. are used, the advantages of high yield and short extraction time are lost, and the products at temperatures below 100° C. are not very good deflocculants for drilling muds. Digestion periods of about 15 minutes to about 4.0 hours are used, but at all events the digestions are stopped while there still remains some content of sulfurous acid salt in the charge. Two hours is ordinarily the practical time limit at the higher temperatures. A smaller proportion of the alkali metal salt of sulfurous acid than that equivalent to about 0.01 part of sulfur dioxide per part of oven-dry bark is insufficient, while more salt than that equivalent to about 0.30 part sulfur dioxide per part of oven-dry bark is more than is needed to carry out the reaction satisfactorily. A preferred range is about 0.05 to 0.15 part of sulfur dioxide per part of oven-dry bark. A slight excess of chemicals acts as a buffer to protect the extractant, particularly at higher temperatures. On the other hand, it is important to avoid such an excessive amount of salt as to cause deleterious effects in the solution of the water-soluble products derived from the processes.

In using the subdivided bark of the sizes indicated, about 10% to 20% of the bark on the basis of its equivalent oven-dry weight is desirable in the charge, the rest of the charge being water and the sulfurous acid salt, preferably a mixture of sodium bisulfite and sodium sulfite. The amount of salt is not critical, except that some salt must be present. The amounts of water indicated are preferable since such amounts provide water to act as solvent for the inorganic material and for the aromatic sulfonates formed, as well as to provide the presence of water and sulfurous acid radical in the reaction mass. Amounts of water in excess of the proportions indicated may be present when barks of the size indicated are used, but water in excess of such proportions tends to slow the reaction by dilution of the chemical, serves in general to require excessive space in the digesters, and eventually gives a very dilute product solution requiring a correspondingly costly evaporation to produce the solids in the form of concentrated solutions or in dry form. In general it is desirable but not necessary to agitate the charge in the digester, since continuous mixing reduces somewhat the time of reaction. The digestion equipment and physical condition of the bark must be capable of bringing the bark material and water solution of alkali sulfurous acid salt into intimate contact. Either batch or continuous operations may be carried out in a single stage or in a multiplicity of stages. The sulfurous acid salt of sodium is satisfactory, and although similar salts of the other alkalis can be used, economy of operation in many cases indicates the use of the sodium salt.

Following the digestion, the products of the reaction as well as any other water-soluble material are separated from the insoluble bark residue. Some of the products of reaction are contained in solution occluded in the bark residue, and in view of their relatively high molecular weight and slow diffusion rates, the separation of this material by washing operations dependent on diffusion has disadvantages, though, however, still representing considerable improvement over older procedures of lixiviating undigested bark. Such separation of occluded reaction materials simply by washing involves uneconomic dilution, and is not even relatively complete unless many changes of water and prolonged soaking periods for diffusion are provided.

Effective and rapid separation of all soluble products of digestion is preferably accomplished by mechanical dislodging aids. Such mechanical dislodging aids or expressing means effectively separate occluded solution and the soluble reaction product contained therein from the bark residue. Expressing, as by compressing the mixture of watery material and bark residue in a continuous screw press or in a batch hydraulic press, is especially effective, in that solutions of maximum concentration are producible. Using batch pressing it will frequently be found desirable to re-slurry the pressed residue in water and repress.

The solutions usually contain a small amount of insoluble material such as bark in fine subdivision which, if desired, may be separated by filtration. The products may be used in the form of water solutions of suitable concentrations or in the form of solids. Concentration of the solutions may be effected by known methods of evaporation, spray drying and the like, either at atmospheric or reduced pressure, but temperatures not exceeding those used in the digestion of the bark are preferable in order to avoid degradation of the phenolic material present. Solid products may be produced by known methods, such as spray drying and drum drying, conducted at atmospheric or reduced pressures, preferably avoiding excessive temperatures and oxidizing conditions which would affect the tannins where further reactions are not desired.

The solvent-extracted barks of Douglas fir, Sitka spruce, southern yellow pine and hemlock trees are composed mostly of water-insoluble material, including a large proportion of insoluble hydroxy aromatic material, but varying small proportions of various water-soluble tannins are present. A considerable proportion of the insoluble part of the bark is converted by the present process of digestion into water-soluble alkali sulfonate salts of hydroxy aromatic compounds. Besides these organic salts, the water-soluble solids in the reaction product comprise alkali sulfurous and sulfuric acid salts derived from the charged inorganic salts. A small but varying proportion of such salts are sulfurous acid salts. The ratio of organic to inorganic material present in the solid product varies and depends upon a number of factors among which are the amount of convertible material in the bark, the amount of the insoluble proportion of the bark material converted and the proportion of bark to inorganic sulfurous acid salt used in the charge. The organic material contains aromatic compounds and will have relatively large proportions of phenolic hydroxy groups in important amounts. Typical of the products produced in solution from the barks of the aforementioned trees as well as those obtained by evaporation to dryness of the solutions derived from the barks are the novel compositions having unique properties which have been found to be especially useful as deflocculating agents for the treatment of oil well drilling muds.

The net yield of organic solids is a measure of the bark material which goes into the product solution and is determined by the formula $$Y = \frac{S_t - S_i}{W} \; 100$$

where Y is the percent net yield, $S_t$ is the weight of the total solid content of the extract solution, $S_i$ is the weight of inorganic salt employed in the process and $W$ is the weight of oven-dry bark treated. The gross yield percent is $100\ S_t/W$.

In carrying out the solvent extractions a stainless steel Soxhlet-type extractor having the capacity to hold from 20 to 25 pounds of air-dried bark was used. The air-subjected to digestion in aqueous solutions each containing $Na_2SO_3$ equivalent to about 0.09 part $SO_2$ per part of dry bark at a temperature of about 150° C. for 30 minutes. The aqueous solutions containing the bark products of the digestions were separated from the bark and the products were spray-dried. The following table shows the yield data from these extractions:

TABLE I

| Bark Species | Solvent Used in Pre-Extn. | Cooking Conditions | | | | | Extract Properties | | |
|---|---|---|---|---|---|---|---|---|---|
| | | $SO_2$:Bark [1] | | Max. Temp., °C. | Time, min. | | Yield, Percent of b.d. bark | | Res'd $SO_2$ Percent of Solids |
| | | Added | Cons. | | At max. temp. | Total | Gross | Net | |
| Douglas fir | None | 0.090 | 0.056 | 150 | 30 | 44 | 49.0 | 31.3 | 7.14 |
| Do | $(C_2H_5)_2O$ | 0.090 | 0.069 | 150 | 30 | 43 | 47.7 | 30.0 | 4.62 |
| Do | $C_6H_6$ | 0.090 | 0.065 | 150 | 30 | 41 | 46.1 | 28.4 | 5.06 |
| Lodgepole pine | None | 0.090 | 0.073 | 150 | 30 | 46 | 59.5 | 41.8 | 3.38 |
| Do | $(C_2H_5)_2O$ | 0.090 | 0.083 | 150 | 30 | 40 | 67.9 | 50.2 | 1.29 |
| Sitka spruce | None | 0.090 | 0.065 | 150 | 30 | 41 | 61.9 | 44.2 | 3.97 |
| Do | $(C_2H_5)_2O$ | 0.090 | 0.064 | 150 | 30 | 41 | 60.2 | 42.5 | 4.72 |
| Ponderosa pine | None | 0.090 | 0.066 | 150 | 30 | 38 | 48.5 | 30.8 | 6.50 |
| Do | $(C_2H_5)_2O$ | 0.090 | 0.068 | 150 | 24 | 32 | 47.6 | 29.9 | 4.39 |
| Short-leaf pine | None | 0.090 | 0.060 | 150 | 30 | 44 | 53.1 | 35.4 | 5.94 |
| Do | $(C_2H_5)_2O$ | 0.090 | 0.078 | 150 | 30 | 40 | 54.5 | 36.8 | 2.78 |

[1] $SO_2$ to bark ratio and yield are based on solvent-extracted bark.

b.d.=bone dry.

dried samples of bark were hammermilled to pass screens of ½ inch and were placed in a cotton sack in the extraction chamber. About fifteen gallons of solvent (ether or benzene) were added and the extraction carried out until aliquots of the solvent passing out of the extraction chamber were free of extractives. Usually 30 to 35 siphonings were required to achieve this objective; i.e., about four to five days of operation for each sample. (A continuous flow-type extractor requires only about 2.5 hours for the same results, however, it is difficult to use ether in a continuous extractor.) Douglas fir, lodgepole pine, Sitka spruce, ponderosa pine, shortleaf pine and western hemlock were extracted with ether. A sample of Douglas fir bark was also extracted with benzene.

The solvent extractions of the samples of shortleaf pine, lodgepole pine, ponderosa pine, Sitka spruce and Douglas fir bark resulted in yields of 3.7, 8.6, 6.8, 3.2 and 14.6% respectively, of extractives based on the weight of the dry bark. These extractions of conifer barks usually remove the following types of materials: waxes (mixtures of esters of long chain fatty acids and alcohols), free long-chain fatty acids, fats, resin acids, unsaturated aliphatic acids or esters, and/or flavonoids. All of the pine extracts were found to contain substantial amounts of resin acids. Spruce and fir bark, on the other hand, contained very small amounts of resin acids. The main constituent of all the extracts was wax. In addition, the lodgepole pine bark extract contained an appreciable amount of myricetin (3,3′,4′,5′,5,7-hexahydroxy flavone), ponderosa pine bark extract contained pinomyricetin (6-methyl myricetin) and quercetin, shortleaf pine and Douglas fir bark extract contained di-hydroquercetin, and Sitka spruce contained a triterpenoid hydroxy ketone which appeared to be a previously undescribed compound. Although the spruce extract only contained very small amounts of resin acids, considerable amounts of unsaturated acids and esters were present. These latter materials were expected to contribute to the foaming tendency of drilling mud additives prepared from unextracted spruce bark.

The aforementioned solvent extracted samples of barks together with unextracted samples of identical barks were The water-soluble bark reaction products of our invention are practically free of the soap-forming constituents of the bark and can be used effectively in contaminated muds, lime base muds or muds containing other alkaline material that would cause the mud containing a product extracted from the bark by solvents to foam. The products are very advantageous additives for controlling the properties of drilling muds. With the widely used soda base muds they effectively reduce the viscosity and reduce the gel strength and water loss characteristics.

It is general practice in the earlier stages of a well drilling operation to employ a sodium base mud. In many cases, however, as the drilling proceeds, conditions are encountered which tend to cause excessive increases in viscosity and gel properties. These tendencies are avoided by converting the mud to a calcium base mud. For example, when the drilling mud is subject to contamination by ordinary salt or by calcium salts, as in drilling through anhydrite or gypsum or in drilling out a cement plug, difficulty will be experienced in effecting proper control of the viscosity and gel properties of a sodium base mud. In such cases it often will be advantageous to convert the mud to the calcium form by addition of lime so as to render the mud less susceptible to changes in properties by contamination. When a calcium base mud is formed, it is necessary to have also present an additive which will be very effective in reducing viscosity and gel strength. Otherwise the mud would become unworkable and stiff. The bark derivatives are very effective in reducing viscosity and gel strength, both in the forming and the maintaining of calcium base muds without causing foaming to any objectional extent. In lime base muds the effectiveness of the thinner on water loss properties has usually been considered less important because such muds are generally treated additionally with colloidal materials such as starch or carboxymethyl-cellulose which very effectively reduce water loss. The solvent-extracted bark derivatives are compatible with such colloidal water loss control materials.

Physical properties of drilling muds may be tested in the laboratory by procedures developed by the American Petroleum Institute, as described in "Recommended Practice for Standard Field Procedure for Testing Drilling Fluids" (API, RR 29, 3rd ed., May 1950). Important properties which are determined in the laboratory include, viscosity, 0 and 10 minute gel strengths and filtration loss (often also termed "water loss," "filter loss," or simply "filtration"). The viscosity may be determined using either a Stormer or a Fann viscometer under standardized conditions. The values given herein were so determined. The zero gel strength, "0 gel strength," is the resistance of freshly stirred mud to the initiation of flow. This is measured with either the Stormer or Fann viscometer. The "10 minute gel strength" is the resistance to initiation of flow of a mud that has been allowed to stand 10 minutes. Thus 0 and 10-minute gel strengths together indicate the gel forming characteristics of the mud and give a measure of gel rate as well as gel strength. Filtration loss is a test in which a mud cake is formed by filtration and pressed against a filter permeable to water. Briefly, it comprises measuring the total volume of filtrate water obtained during a given time of pressure filtration which may conventionally be thirty minutes. This test serves to measure the ability of a drilling mud to form a thin filter cake on the bore hole wall to seal it off and thereby prevent loss of water to formation being drilled. These laboratory evaluations indicate the kind and amounts of different materials to add to the muds in order that the muds will have the desired operating characteristics. The foam properties of a drilling mud may be determined in various well known ways. One effective means is to determine the weight of the drilling mud in pounds per gallon.

Southern pine bark air dried to 86.6% bone dry, without solvent extraction, was digested with a water solution of $Na_2SO_3$ equivalent to 0.09 part $SO_2$ per part of dry bark at 150° C. for 30 minutes (Product 1).

Southern pine bark air dried to 86.6% bone dry, was extracted in a Soxhlet type extractor for 20 hours with ethyl ether. The extracted bark was thoroughly air dried and then digested with a water solution of $Na_2SO_3$ as above described (Product 2).

Southern pine bark as received from the tree and containing 67.1% bone dry bark, was digested with a water solution of $Na_2SO_3$ as above described (Product 3).

The following table illustrates the effectiveness, in drilling mud compositions, of the Products 1, 2 and 3.

TABLE II

*Drilling mud tests of southern pine bark products*

| Bark Product | lb./bbl. Additive | Mud Wt., lb./gal. | pH of Mud | Viscosity, cp. | Gel Strength | | Filtration | |
|---|---|---|---|---|---|---|---|---|
| | | | | | 0 | 10 min. | ml./30 min. | Cake, in. |
| LOW pH SERIES | | | | | | | | |
| 1 | ¼ | 9.0 | 8.5 | 42.5 | 44 | 78 | 8.8 | 1/16 |
| 2 | ¼ | 9.0 | 8.5 | 39 | 40 | 67 | 8.4 | 1/16 |
| 3 | ¼ | 8.9 | 8.65 | 47.5 | 46 | 72 | 9.2 | 1/16 |
| 1 | 2 | (¹) | 8.55 | 28.5 | 32 | 52 | 7.4 | 1/16 |
| 2 | 2 | 8.9 | 8.55 | 30.5 | 36 | 62 | 7.6 | 1/16 |
| 3 | 2 | 7.9 | 8.75 | 23.5 | 36 | 59 | 8.2 | 1/16 |
| 1 | 6 | (¹) | 8.55 | 35.5 | 35 | 54 | 6.6 | 1/16 |
| 2 | 6 | 7.8 | 8.55 | 37.5 | 37 | 67 | 6.8 | 1/16 |
| 3 | 6 | (¹) | 8.50 | 36 | 37 | 55 | 6.6 | 1/16 |
| HIGH pH SERIES | | | | | | | | |
| 1 | ¼ | 9.0 | 12.2 | 29.0 | 1 | 8 | ------ | 1/16 |
| 2 | ¼ | 9.0 | 12.2 | 28.5 | 1 | 10 | 10.8 | 1/16 |
| 3 | ¼ | 9.0 | 12.25 | 30 | 2 | 8 | 11.0 | 1/16 |
| 1 | 2 | 8.8 | 12.15 | 17.0 | 1 | 2 | 11.8 | 1/16 |
| 2 | 2 | 9.1 | 12.2 | 16.0 | 1 | 3 | 11.6 | 1/16 |
| 3 | 2 | 8.8 | 12.2 | 15 | 1 | 2 | 11.8 | 1/16 |
| 1 | 6 | (¹) | 11.9 | 31.5 | 2 | 18 | ------ | 1/16 |
| 2 | 6 | 8.7 | 11.95 | 28 | 2 | 14 | 12.0 | 1/16 |
| 3 | 6 | (¹) | 11.95 | 31 | 1 | 24 | 11.0 | 1/16 |
| CONTAMINATION SERIES: 1 LB./BBL. $CaSO_4 \cdot 2H_2O$ | | | | | | | | |
| 1 | 2 | 8.6 | 8.4 | 22 | 28 | 51 | 8.0 | 1/16 |
| 2 | 2 | 8.6 | 8.35 | 21 | 26 | 50 | 8.8 | 1/16 |
| 3 | 2 | 7.8 | 8.5 | 22 | 28 | 46 | 8.8 | 1/16 |
| 2 LB./BBL. CEMENT | | | | | | | | |
| 1 | 3 | 8.8 | 11.0 | 20 | 2 | 58 | 11.8 | 1/16 |
| 2 | 3 | 8.9 | 11.0 | 19.5 | 2 | 54 | 11.0 | 1/16 |
| 3 | 3 | 8.4 | 10.9 | 19.5 | 2 | 74 | 11.6 | 1/16 |
| 1% (3.5 GM.) NaCl | | | | | | | | |
| 1 | 2 | 8.7 | 8.5 | 24 | 26 | 51 | 10.2 | 1/16 |
| 2 | 2 | 8.6 | 8.6 | 24.5 | 29 | 62 | 9.4 | 1/16 |
| 3 | 2 | 8.5 | 8.5 | 23 | 29 | 51 | 10.0 | 1/16 |

¹ Mud weight less than 7.8 lb./gal. Composition "air-cut" excessively.

Oven-dry Douglas fir bark was extracted with ethyl ether in a Soxhlet type extractor for 36 hours. Most of the ether-soluble material was removed in the first few hours; however, extraction was continued for this period to insure complete extraction. The extracted bark was then digested with a water solution of $Na_2SO_3$ equivalent to 0.09 part $SO_2$ per part of dry bark at 150° C. for 30 minutes (Product 1). The same bark without solvent extraction was digested in the same manner with $Na_2SO_3$ solution (Product 2).

The following table illustrates the comparative effectiveness in drilling mud compositions containing Products 1 and 2.

TABLE III

*Evaluation of Douglas fir bark products as drilling mud additives*

| Bark Products | lb./bbl. Additive | Mud Wt., lb./gal. | pH of Mud | Viscosity, cp. | Gel Strength 0 | Gel Strength 10 min. | Filtration ml./30 min. | Filtration Cake, in. |
|---|---|---|---|---|---|---|---|---|
| CONTAMINATION SERIES: 1 LB./BBL. CaSO₄·2H₂O | | | | | | | | |
| 1 | 2 | 9.0 | 8.2 | 10 | 11 | 12 | 12.0 | 1/16 |
| 2 | 2 | 8.5 | 8.4 | 14.5 | 16 | 29 | 11.0 | 1/16 |
| 1% (3.5 GM.) NaCl | | | | | | | | |
| 1 | 2 | 8.8 | 8.3 | 15.0 | 16 | 34 | 11.4 | 1/16 |
| 2 | 2 | 8.5 | 8.3 | 15.5 | 16 | 36 | 11.4 | 1/16 |
| LIME MUD:¹ | | | | | | | | |
| 1 | 3 | 8.9 | 12.9 | 9.5 | 2 | 24 | 13.6 | 1/16 |
| 1 | 3 | 8.9 | 12.9 | 9.5 | 2 | 22 | 13.4 | 1/16 |
| 1 | 3 | 8.9 | 12.9 | 9.5 | 2 | 22 | 13.0 | 1/16 |
| 2 | 3 | 8.8 | 12.9 | 9.5 | 2 | 27 | 13.4 | 1/16 |
| 2 | 3 | 8.8 | 12.8 | 9.5 | 2 | 25 | 13.4 | 1/16 |
| 2 | 3 | 8.7 | 12.8 | 9.5 | 4 | 32 | 13.2 | 1/16 |
| 1 NaCl² | 3 | 8.7 | 12.7 | 9 | 3 | 26 | 14.6 | 1/16 |
| 1 NaCl² | 3 | 8.6 | 12.8 | 9 | 3 | 26 | 14.4 | 1/16 |
| 1 NaCl² | 3 | 8.5 | 12.7 | 9 | 3 | 27 | 14.4 | 1/16 |
| 2 NaCl² | 3 | 8.3 | 12.7 | 9 | 3 | 27 | 14.6 | 1/16 |
| 2 NaCl² | 3 | 8.3 | 12.7 | 9 | 3 | 28 | 14.6 | 1/16 |
| 2 NaCl² | 3 | 8.5 | 12.7 | 9.5 | 4 | 34 | 14.4 | 1/16 |

¹ Mixing Procedure:
  Additive 1 min. mix (NaCl added at this point).
  NaOH (3 lbs./bbl.), 5 min. mix.
  Ca(OH)₂ (5 lbs./bbl.), 5 min. mix.
² 0.3% NaCl by volume of the mud.

The barks from Douglas fir, lodgepole pine, Sitka spruce, ponderosa pine and shortleaf pine were digested in a water solution of Na₂SO₃ equivalent to 0.09 part SO₂ per part of dry bark at 150° C. for 30 minutes (Products 1, 2, 3, 4 and 5 respectively). The same kind of barks were first extracted with ether to remove the acids and waxes and then were digested with Na₂SO₃ as above described (Products 6, 7, 8, 9 and 10 respectively).

One sample of the Douglas fir bark was extracted with benzene and then digested with Na₂SO₃ as above described (Product 11).

The following table illustrates the effectiveness in drilling mud compositions of the Products 1 to 11 inclusive.

TABLE IV

| Bark Product | Mud Weight, lb./gal. Break-over | Mud Weight, lb./gal. Aged | pH of Mud | Apparent Viscosity, cp. | Plastic Viscosity, cp. | Yield Value, lbs./100 sq. ft. | Gel Strength, lbs./100 sq. ft. 0 | Gel Strength, lbs./100 sq. ft. 10 min. | Fluid Loss ml./30 min. | Fluid Loss Cake, 32nds |
|---|---|---|---|---|---|---|---|---|---|---|
| Control Mud | | | | 18 | 6 | 24 | 28 | 43 | | |
| [Diluted (50 ml.) Lime Mud + 0.3% Salt (NaCl)] | | | | | | | | | | |
| DOUGLAS FIR BARK PRODUCTS | | | | | | | | | | |
| 1 | 7.3 | 7.3 | 13.0 | 11 | 13 | 2 | 3 | 21 | 13.4 | 2 |
| 6 | 9.1 | 9.0 | 13.0 | 10 | 8 | 4 | 4 | 36 | 13.8 | 2 |
| 11 | 8.7 | 8.0 | 13.0 | 10 | 8 | 5 | 3 | 26 | 14.4 | 2 |
| LODGEPOLE PINE BARK PRODUCTS | | | | | | | | | | |
| 2 | <7.0 | 7.0 | 13.1 | 13 | 10 | 5 | 2 | 20 | 14.2 | 2 |
| 7 | 9.1 | 9.0 | 13.1 | 9 | 7 | 4 | 2 | 26 | 15.2 | 2 |
| SITKA SPRUCE BARK PRODUCTS | | | | | | | | | | |
| 3 | 7.8 | 8.5 | 13.1 | 8 | 7 | 2 | 2 | 9 | 14.8 | 2 |
| 8 | 8.8 | 8.9 | 13.0 | 7 | 6 | 3 | 2 | 8 | 14.4 | 2 |
| PONDEROSA PINE BARK PRODUCTS | | | | | | | | | | |
| 4 | <7.0 | <7.0 | 13.0 | 11 | 8 | 6 | 5 | 22 | 15.2 | 2 |
| 9 | 9.1 | 8.9 | 13.0 | 8 | 6 | 4 | 2 | 24 | 16.4 | 2 |
| SHORTLEAF PINE BARK PRODUCTS | | | | | | | | | | |
| 5 | 7.6 | 8.0 | 13.0 | 9 | 8 | 2 | 2 | 16 | 15.4 | 2 |
| 10 | 8.9 | 8.9 | 13.1 | 8 | 6 | 4 | 2 | 16 | 15.2 | 2 |

This application is a continuation-in-part of our patent applications Serial Nos. 304,004, 381,472, 431,586, 492,042 and 530,192, filed August 12, 1952, September 21, 1953, May 2, 1954, March 3, 1955, August 23, 1955, respectively. Application Serial No. 304,004, is now U.S. Patent No. 2,831,022, and the other four applications are now abandoned.

The solvent extraction of the bark may be carried out to such an extent as to make it amenable to an efficient digestion with a selected composition of sodium salt of sulfurous acid. In the case of Douglas fir bark it is advantageous to follow a partial solvent extraction with a digestion solution consisting of sodium bisulfite with or without sodium sulfite. In the case of southern pine barks, exhaustive solvent extraction can be followed with digestion in an aqueous solution of sodium sulfite, however, it is advantageous to use less extensive solvent extraction and to follow this with digestion in an aqueous solution of sodium bisulfite, or with a mixture of sodium bisulfite and sodium sulfite preferably acidified, or in such proportions as to be at least slightly acid. While we may use any suitable proportions of sodium bisulfite and sodium sulfite, it is advantageous to use a mixture containing at least 50% sodium bisulfite and preferably a mixture consisting of about 75% sodium bisulfite and about 25% sodium sulfite at a pH of from 5.5 to 6.5. The invention makes it possible to carry out an efficient partial solvent extraction followed by digestion with a sodium bisulfite-containing solution that would be attainable only with an exhaustive solvent extraction followed by digestion with an aqueous solution of sodium sulfite, and to vary the extent of solvent extraction and select the digestion chemicals that will react most effectively with the chemicals remaining in the bark, thereby producing a product which is superior for use in drilling muds.

We claim:

1. An aqueous drilling mud comprising a hydratable clay dispersed in water and a bark product derived from the bark of a coniferous tree of the group consisting of Douglas fir, Sitka spruce, southern yellow pine, shortleaf pine and hemlock by extracting the bark with an organic solvent to remove soap-forming materials and digesting the extracted bark in an aqueous solution of an alkali metal salt of sulfurous acid of the group consisting of sodium and potassium at a temperature of from 105° C. to 200° C. until some of the sulfurous acid radical of the inorganic salt is consumed and a portion of the sulfurous acid thus consumed is combined in a water-soluble derivative of a water-insoluble portion of the bark, said bark product being characterized by being substantially free of soap-forming materials and containing water-soluble hydroxy aromatic alkali metal sulfonate compounds derived from the digestion of the bark, said drilling mud containing from about 1 to 10 pounds per barrel of the bark product.

2. An aqueous drilling mud as defined in claim 1 in which the solvent extracted material removed from the bark comprises fatty acids, resin acids and waxes.

3. An aqueous drilling mud as defined in claim 1 in which the bark product is obtained by incompletely extracting the bark with an organic solvent to remove a substantial part but not all of the soap-forming materials, and digesting the extracted bark with an aqueous solution comprising sodium bisulfite and sodium sulfite.

4. An aqueous drilling mud comprising a hydratable clay dispersed in water and a bark product derived from the bark of a tree of the group consisting of Douglas fir, Sitka spruce, southern yellow pine, shortleaf pine and hemlock by extracting the bark with an organic solvent to remove a substantial proportion of the soap-forming materials, removing from the bark adhering and imbided solvent, digesting the bark at a temperature of from 105° to 200° C. in an aqueous solution of sodium bisulfite and sodium sulfite in which the amount of chemicals is such that not all of the sodium bisulfite and sodium sulfite are consumed, and separating said product from the aqueous digestion liquor, said drilling mud containing from 1 to 10 pounds per barrel of said bark product.

5. A drilling mud as defined in claim 4 in which the digestion is carried out with an aqueous solution containing about 75% sodium bisulfite and about 25% sodium sulfite at a pH of from 5.5 to 6.5.

6. An aqueous drilling mud comprising a hydratable clay dispersed in water and a bark product derived from the bark of a coniferous tree of the group consisting of Douglas fir, Sitka spruce, southern yellow pine, shortleaf pine and hemlock by extracting the bark with an organic solvent to remove substantially all of the removable soap-forming material, removing from the bark the adhering and imbibed solvent, digesting the bark at a temperature of from 105° to 200° C. in an aqueous solution consisting preponderantly of sodium sulfite in an amount such that not all the sodium sulfite will be consumed, removing the bark product from the digestion solution, said drilling mud containing from 1 to 10 pounds per barrel of the product.

References Cited in the file of this patent

UNITED STATES PATENTS

| | | |
|---|---|---|
| 2,674,575 | Lewis et al. | Apr. 6, 1954 |
| 2,674,594 | Lewis et al. | Apr. 6, 1954 |
| 2,698,233 | Lewis et al. | Dec. 28, 1954 |
| 2,782,241 | Gray et al. | Feb. 19, 1957 |